Patented July 17, 1928.

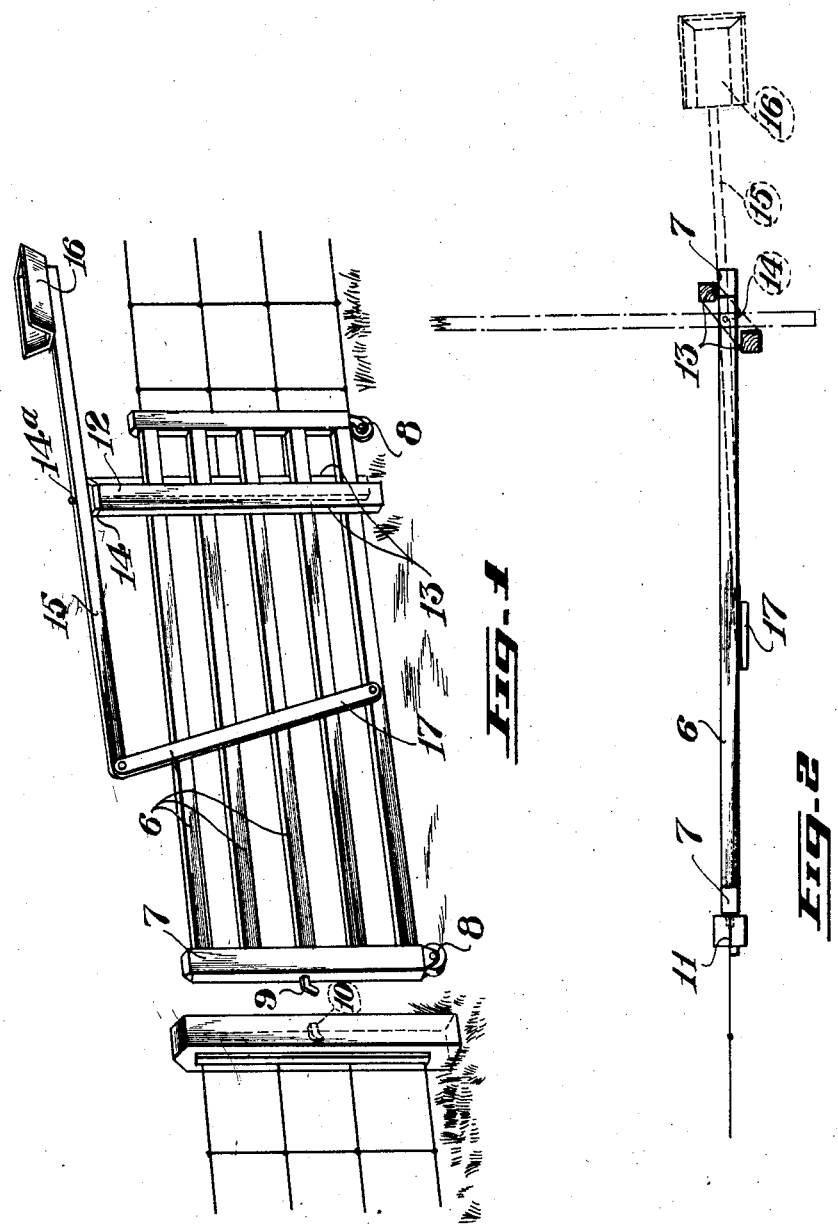

1,677,708

UNITED STATES PATENT OFFICE.

BENJAMIN W. COOK, OF MIDLAND, MICHIGAN.

GATE.

Application filed April 26, 1927. Serial No. 186,679.

This invention has relation to certain new and useful improvements in gates and appertains more particularly to that class having a wood or wire body and specially adapted for use on the farm.

The primary object of the invention resides in the provision of a gate of the character stated that may be readily moved longitudinally through one of the gate posts or swung therein to open or closed position, with comparative ease, because of a counterbalance weight and improved roller casters.

A further object of the invention resides in the provision of a gate of simple yet sturdy construction, easily built and capable of production at a reasonable cost, and thus rendered commercially desirable.

To the accomplishment of these and related objects my invention resides in the construction, combination and arrangement of parts as shall be hereinafter more fully described, illustrated in the accompanying drawings and pointed out in the claim hereunto appended.

The invention will be best understood and can be most clearly described when reference is had to the drawings, forming a part of this disclosure and wherein like characters indicate like parts throughout the several views.

In the drawings.

Fig. 1 is a perspective view of the improved gate, showing the same nearly closed;

Fig. 2 is a top plan view, with the gate in closed position and indicating by dotted lines, one of the open positions of the gate;

Referring more in detail to these drawings, it is to be noted that the gate body structure shown in Figures 1 and 2, includes spaced longitudinal bars 6 connecting at their ends with the vertical end bars 7 forming the ends of the gate. Roller casters 8 are provided at the lower ends of the gate bars 7, to provide for free and easy opening and closing of the gate either longitudinally or transversely of the fence. It is also to be noted that the bars 6 have their ends extended into and secured firmly in the end bars 7, as shown in Fig. 1, thus providing a strong gate.

Projecting from the forward end bar 7 of the gate is the gate lock member 9, adapted to be received in the opening 10 in the gate post 11, as will be readily apparent by referring to Fig. 1 of the drawings. It will be evident that the gate will be securely locked in closed position, by the gate lock member 9 but may be released by drawing back the gate from the post 11, thus permitting the gate to be readily opened by sliding the same longitudinally or swinging it transversely, as hereinafter disclosed.

The other gate post 12 is slotted vertically or longitudinally and the gate works through the same, as indicated in Fig. 2. It will also be noted from this view, that the post 12 is in the form of two upstanding squared members 13, which are offset from one another, on opposite sides of the gate and the fence. This permits the gate to be turned or swung in the post 12, to open position, at one side of the fence and at right angles thereto, as shown by dotted lines in Fig. 2.

At their upper ends, the members 13 of the post 12 are connected by the cap 14 forming the upper end of the post 12, as shown in Fig. 1. Pivoted on the cap or upper end of the post 12, by the pivot member 14ᵃ is the gate elevating lever 15, on the upper side of the outer end of which is mounted the counterbalancing weight 16, as shown. The other or forward end of the lever 15, is pivoted to the upper end of the depending lever 17, which in turn has its lower end pivoted to the lower gate bar 6, intermediate the ends thereof, as illustrated in Fig. 1.

In conclusion, it may be briefly stated that the gate can be readily opened or closed by either sliding or swinging the same and will operate freely on the roller casters 8, owing to the weight of the gate being counterbalanced by the weight 16 on the elevator lever.

From the foregoing description taken in connection with the accompanying drawings, it will be manifest that a gate is provided that will fulfill all the necessary requirements of such a device, but as many changes could be made in the above description and many apparently widely different embodiments of my invention constructed within the scope of the appended claim without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

A gate structure including a vertically slotted post with an upstanding pin in the top thereof; a second post having a lock receiving recess; a gate member mounted for longitudinal sliding movement through the first mentioned post and horizontal swinging movement therein in an arc up to ninety degrees; a gate elevating lever loosely mounted on said pin; a depending lever pivoted at its upper end to one end of the first mentioned lever and at its lower end to the lowermost edge of the gate member at the center thereof whereby said gate member will be raised as it slides back in the first mentioned post to disengage the gate member from the second post and disengage the latch member carried thereby from the said lock receiving recess in the said second post; casters carried by said gate member at the lower corners thereof to support the weight of said gate member when resting on the ground; and a weight on the outer portion of said gate elevating lever.

In testimony whereof I hereunto affix my signature.

BENJAMIN W. COOK. [L. S.]